United States Patent [19]

Hergaux

[11] 4,295,778
[45] Oct. 20, 1981

[54] APPARATUS FOR LIFTING WASTE CONTAINERS ON TO TRUCKS

[76] Inventor: Claude Hergaux, 6 & 8 Rue de l'Avenir, 76120 Grand Quevilly, France

[21] Appl. No.: 969,072

[22] Filed: Dec. 13, 1978

[30] Foreign Application Priority Data

Mar. 17, 1978 [FR] France .................. 78 08249

[51] Int. Cl.³ ............................................. B60P 1/00
[52] U.S. Cl. ................................. 414/525 R; 414/408
[58] Field of Search ............... 414/422, 424, 525 R, 414/408, 546, 702, 680, 743

[56] References Cited

U.S. PATENT DOCUMENTS

| | | | |
|---|---|---|---|
| 3,122,249 | 2/1964 | Dempster et al. | 414/408 |
| 3,662,910 | 5/1972 | Herpich et al. | 414/408 |
| 3,762,586 | 10/1973 | Updike, Jr. | 414/408 |
| 3,905,498 | 9/1975 | Van der Lely | 414/546 |
| 3,921,839 | 11/1975 | Herpich | 414/408 |
| 4,091,944 | 5/1978 | Gollnick | 414/408 |

Primary Examiner—Trygve M. Blix
Assistant Examiner—L. E. Williams

[57] ABSTRACT

An articulated mechanism for lifting waste containers onto vehicles includes a pair of first levers carried pivotably by opposed sidewalls of the vehicle, a hydraulically operable piston-cylinder assemblies connected to the first lever to effect pivotable movement thereof, second levers carried by the first lever members for movement therewith and for pivotable movement thereto. The second levers are connectable to the container. The levers are positioned so that the container is lifted and carried in an arc over to the vehicle.

8 Claims, 4 Drawing Figures

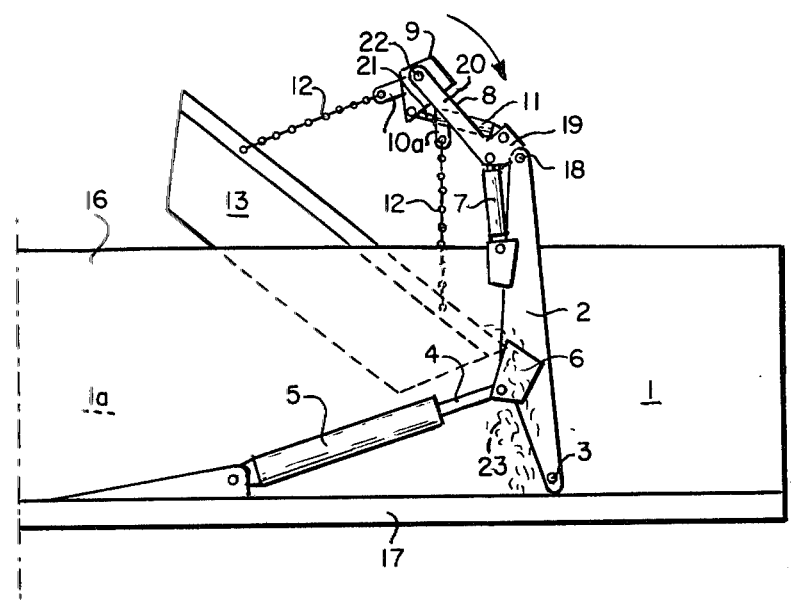
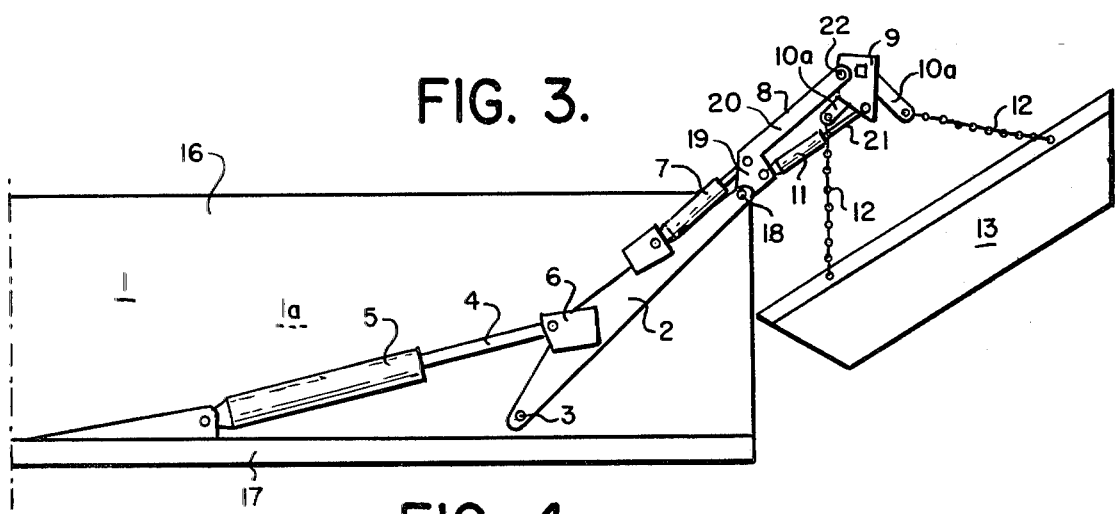
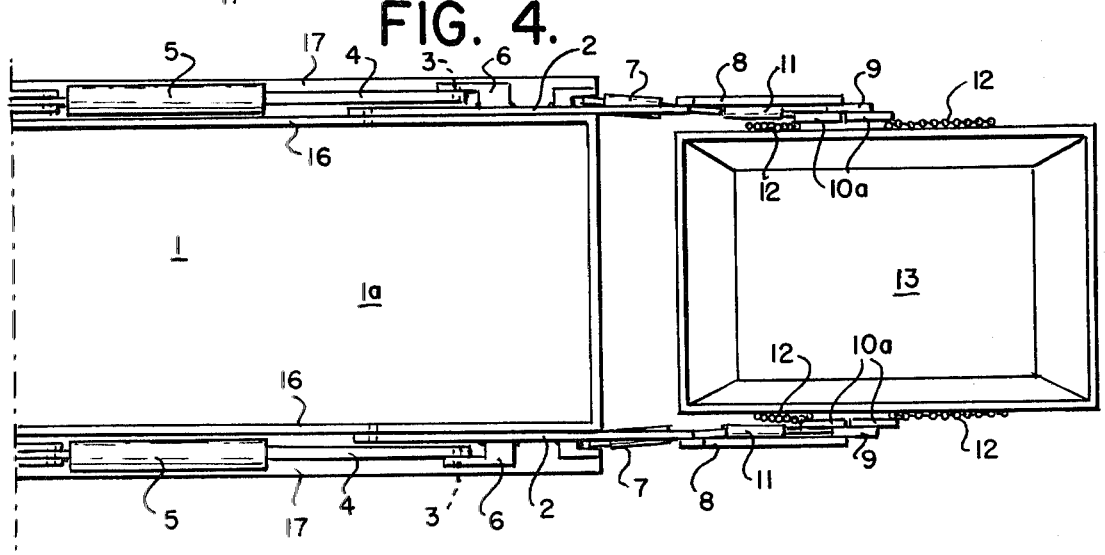

APPARATUS FOR LIFTING WASTE CONTAINERS ON TO TRUCKS

BACKGROUND OF THE INVENTION

The present invention relates to apparatus for lifting and unloading bulk material containers into the storage compartment of the vehicle.

As is well known, waste materials from apartment or home complexes and industrial sites are generally stored in various types of large multi-yard (volume) containers which are placed outside the premises, where after they are filled or after a given period of time they are collected and removed for ultimate disposal such as by incineration. Conventionally, the waste material is removed at the site by transferring it to a dump truck having a very large storage compartment. The collection procedure conventionally requires that one or more persons physically lift the storage containers and empty same into the compartment of the vehicle. Such manual collection of the waste materials is both time consuming and expensive; vehicles of this type requiring two persons in addition to the driver.

Recently, lift mechanisms have been mounted on the dump truck enabling the mechical lifting of the containers and reducing some of the labor interval problems. These mechanisms, however, are fitted to the exterior of the dump truck and comprise complex mechanical arms which lift the container high over the storage compartment of the truck (too high for good safety standards) and then in a complex arc downwardly into the truck. In addition, the conventional lift mechanism presents an enlarged and dangerous extension behind and above the dump truck which is hazardous on the streets and highways of cities.

It is an object of this invention to provide apparatus for the collection of bulk waste materials requiring a minimum manual labor.

It is an object of this invention to provide lift apparatus for loading the contents of containers on vehicles which is simple, non-complex and easy to employ.

Yet another object of this invention is the provision of lift apparatus capable of expediting the collection of bulk waste materials by reducing the collection time and also minimizing labor costs.

Other objects and advantages of the invention will become readily apparent to persons versed in the art from the ensuing description.

SUMMARY OF THE INVENTION

In accordance with this invention there is provided apparatus for loading a vehicle with bulk material from containers in which said material is temporarily stored comprising a pair of first lever members adapted to be pivotably carried along opposed sides of a vehicle for pivotable movement in a generally vertical plane; first means for applying a force to first member levers to effect pivotable movement thereof; a pair of second lever members carried respectively by said first lever members for movement therewith, and second lever members being also carried by said first lever members for pivotable lever movement relative thereto; second means for applying a force to second lever members to effect pivotable movement thereof; a pair of third lever members carried respectively by said second lever members for movement therewith and also pivotable movement relative thereto, said third lever members including means for supporting at least two chains or cables in spaced relation; and third means for applying a force to said third lever members to effect pivotable movement thereof.

BRIEF DESCRIPTION OF THE DRAWINGS

In order that the invention may be more fully comprehended it will now be described by way of example with reference to the accompanying drawings in which:

FIG. 2 is a side elevational view similar to that of FIG. 1 showing the container lifted by the apparatus of the invention and tilted so as to discharge the material into the storage compartment of the vehicle.

FIG. 3 is a view similar to that of FIGS. 1 and 2 in which the apparatus of the invention is shown suspending the container in mid-air; and FIG. 4 is a top plan view of the vehicle and apparatus shown in FIG. 1.

DESCRIPTION OF THE PREFERRED EMBODIMENTS

Figure 1:
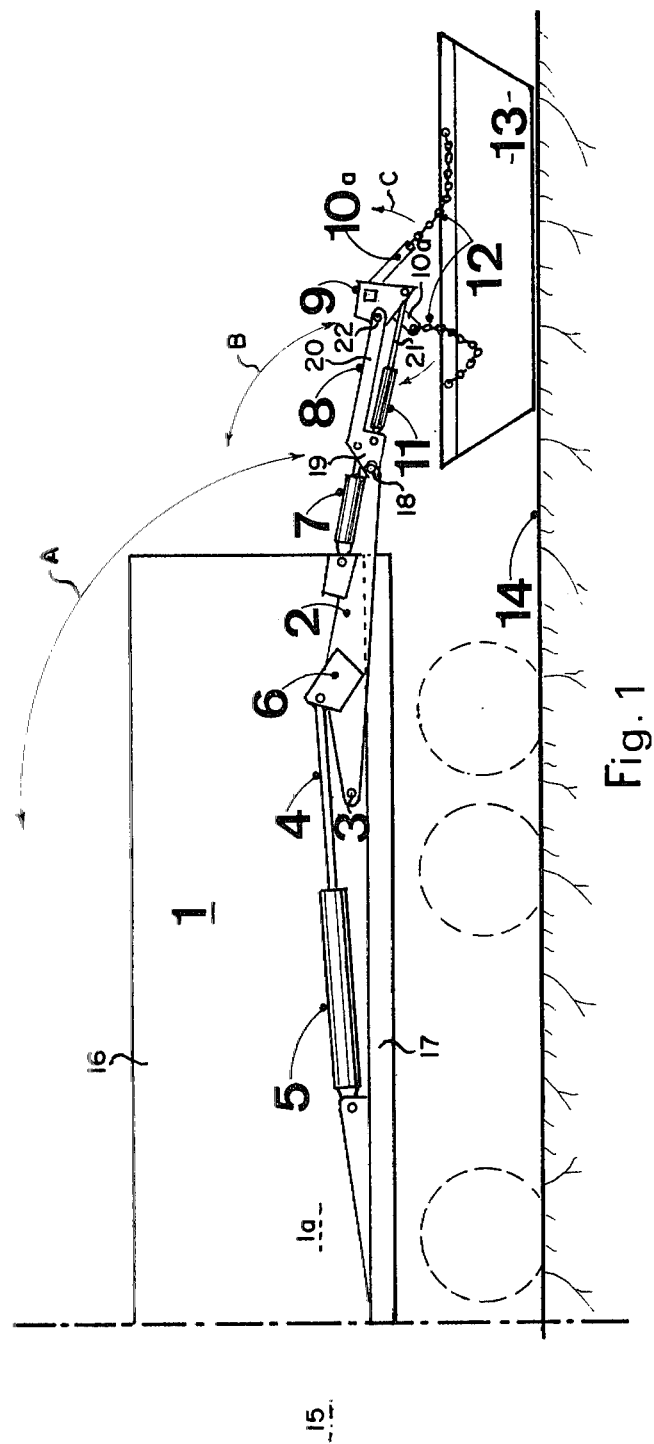
FIG. 1 is a side elevational view of a vehicle with the apparatus of this invention secured in place thereon.

Referring to the drawings, there is shown a vehicle such as a dump truck or flat body truck 1, of the type having a storage compartment 1a, located behind the cab (not shown) of the vehicle. The compartment 1a is used as a storage receptacle in the transport of the waste materials from the point of their collection to the location where such waste materials are disposed of such as an incinerator or other garbage disposal site.

To facilitate the collection procedure at the site of waste material manufacture, stationary container 13 of generally large volume are provided, in which the waste is accumulated. The vehicle is periodically driven to the container, which is emptied into the storage compartment and driven off leaving the stationary container for filling. The vehicle is provided with an arrangement of articulatable arms which act in concert in the grasping, raising of the container above compartment 1a, tilting of the container so as to empty its contents into compartment 1a, and replacing of the container 13 on its original support surface such as the ground 14.

The articulatable arm arrangement comprises basically a first lever member 2 which is carried along the side of the vehicle outside the container 1a, the lever member is in the form of an elongated plate member somewhat triangular in shape, mounted at one end, to the frame of the vehicle, to pivot about a pivot axle 3 so that it is swingable about an arc A. Mounting of the lever member 2 can be accomplished by journalling the pivot axle 3 in either the side wall 16 of the vehicle or in the vehicle bed 17. A jack 5 comprising a piston and cylinder arrangement is secured at its rear end to the vehicle bed 17 and has a rod element 4, capable of reciprocating movement, connected to lever member 2 at a central point thereof so as to be offset from the pivot axle 3 of the lever member.

As shown in FIG. 1, the piston rod is connected to a gusset or projection 6, secured on the lever member 2 to form a bell crank to assure the imparting of an eccentric force for the required swinging movement of the lever member 2. However, it will be understood that such gusset or projection 6 may either be a separate element fixedly secured to the lever member or, alternatively, the lever member may be formed so as to have such a projection integral therewith. In any event, the lever is pivotable about the axle 3 in a generally vertical plane which is parallel to the side wall of the vehicle.

A second lever member 8 comprising an elongated straight bracket is secured by a pivot axle 18 at one end to lever member 2 so that it is capable of movement jointly with lever member 2 when the latter member is pivoted by jack 5 and is also capable of independent swinging movement in an arc B relative to lever member 2 by virtue of its pivotal connection with lever member 2. A second jack 7 is mounted upon lever member 2 generally along its upper edge and includes a rod which is connected to the second lever member 8 in such manner as to ensure pivotal movement of lever member 8 about the axle 18. Jack 7 is preferably of the same type as jack 5, although its size and capacity need not be the same.

A third lever member 9, which may take the form of an irregularly formed plate, is pivotably carried at the forward end of the second lever member 8 to which it is connected by a pivot axle 19. A third jack 11 is mounted between the second lever member 8 and to third lever member 9 generally below the lower edge of the second lever member. The third jack 11 includes rod 21 which is connected to lever member 9 at a location such that a retraction or an extension of the rod results in pivotal movement of the third lever member 9 about its pivot axle 19. Lever member 9 is provided with a pair of downwardly directed arms 10a and 10b which extend at angles to each other and serve as means for supporting a pair of chains 12 secured to container 13.

From FIG. 1 it will be observed that that the multiple arm arrangement extends generally at approximately the level and parallel to the bed of the vehicle, by maintaining jacks 5, 7, and 11 normally extended. This enables the arms to move into the positions illustrated in FIGS. 2 & 3 during the operation of the device. Thus, when the apparatus is in use and connected to the chains or cables or a container 13 having waste material therein to be collected, retraction of the rod 4 of jack 5 will result in the counterclockwise movement of lever member 2 and a raising of the remainder of the arm assembly merely by maintaining jacks 7 and 11 immobile. Once the container has been elevated to the position shown in FIG. 2, retraction of the piston rods associated with jack 7, and jack 11 effects tilting of container 13 causing it to empty its waste material into compartment 1a. The arm arrangement shown in FIG. 3 illustrates the multiple arms and container at an intermediate stage and would be representative of the arrangement when the container is either being lifted, or lowered after the waste material had been emptied. Thus, in FIG. 3 the piston rods of each of the jacks would be partially extended.

It will be understood that each of the jacks are conventional in construction and preferably comprised units which are operable under the influence of a pressurized fluid such as oil. However, it is within the contemplation of this invention to also employ compressed air cylinders if so desired. Since these units are conventional as are the pumps and motors required to complete the systems, in the interest of brevity and clarity, such systems have not been shown. Suitable control means, located in the cab of the vehicle, fluid storage pump means, conduit, etc., would of course be supplied. It is considered well within the expertise of persons skilled in this art to supply the details of the support systems for jacks 5, 7, and 11, which are themselves pivotally connected at their respective ends to permit the desired articulation.

From the foregoing description, it will be seen that apparatus has been provided which will greatly facilitate the collection of both waste materials, reducing the amount of labor required to effect the transfer of such materials from temporary storage containers to the vehicles required to transport the waste material elsewhere for disposal.

It will be observed that the tripartite articulation, and tripartite actuation means, permits versatile flexing of the lifting means. This enables use of the duplex truck with varying size containers, particularly differentiating in length although differences in width will also be accommodated. The central lever arm 8 and its actuation jack 7 permit the container to be lifted which being maintained as close to the vehicle as possible distinguishing from conventional lift means which have a fixed aim and, thus, a fixed radius through which the container moves, such radious being excessive in order to be able to carry the largest containers.

While chains have been shown as means for attaching the container, the chains 12 can be replaced by fixed bars, brackets, or the like with suitable hook means.

Various other modifications and changes can be made as will be obvious to those skilled in this art. Consequently, it is intended that the present disclosure be illustrative only and not limiting of the scope of the invention.

What is claimed is:

1. Apparatus for unloading the contents of a relatively large waste container onto a vehicle comprising a lifting assembly located on each side of said vehicle, each of said assemblies comprising a first elongated lever member pivotably mounted at one end to said vehicle and extending along the side of the vehicle for pivotable movement in a generally vertical plane; first means mounted on said vehicle for applying a force to said first lever member to effect pivotable movement thereof; a second elongated lever member carried at one end by the extended end of said first lever member for movement conjointly therewith in said vertical plane and for pivotable movement relative thereto; second means for applying a force to said second lever member mounted on said first lever member to effect pivotable movement thereof: a third lever member carried on the extended end of said second lever member for conjoint movement therewith in said vertical plane and also for pivotable movement relative thereto, said third lever member including means for supporting at least two chains or cables in spaced relation; and third means for applying a force to said third lever member mounted on said second lever to effect pivotable movement thereof, said lever members in each of said assemblies being selectively movable from a first position in which said levers extend along a substantially horizontal axis at the sides of the vehicle and a second position wherein said levers are articulated in said vertical plane to carry the containers above said vehicle, said second and third levers being selectively movable with respect to each other and the first lever to tilt said container in said second position said third lever being movable in an arc sufficient to invert said container beyond the vehicle.

2. Apparatus according to claim 1, wherein said force applying means comprise piston-cylinder units operable by fluid pressure.

3. Apparatus according to claim 2, wherein said piston-cylinder units are operable by hydraulic pressure.

4. Apparatus according to claims 1, 2, or 3, comprising a truck-type vehicle with a storage compartment having opposed side walls, said first, second, and third lever members and associated force applying means being mounted on the opposed vehicle sidewalls.

5. Apparatus according to claim 4, wherein said first lever members are carried by the sidewalls of the vehicle so as to be pivotable about axes which are located substantially at the floor level of said storage compartment.

6. Apparatus according to claim 4, wherein said first lever members comprise elongated plate members which are pivotably secured adjacent one end thereof to the vehicle.

7. Apparatus according to claim 6, wherein said second lever members and said second force applying means are carried by said first lever members, said second lever members being pivotably secured adjacent the other ends of said first lever members.

8. Apparatus according to claim 7, wherein said third lever members and said third force applying means are carried by said second lever members, the chain or cable support means of said third lever members comprising at least two outwardly projecting arms.

* * * * *